Patented Oct. 11, 1932

1,882,335

UNITED STATES PATENT OFFICE

LINDLEY E. MILLS, OF MIDLAND, MICHIGAN, ASSIGNOR TO THE DOW CHEMICAL COMPANY OF MIDLAND, MICHIGAN, A CORPORATION OF MICHIGAN

METHOD OF SEPARATING HALO-BENZOIC ACIDS

No Drawing.   Application filed December 17, 1929.   Serial No. 414,829.

The present invention relates to the separation of ortho- and para-halo-benzoic acids, particularly to a method involving the separation of ortho- and para-chloro-benzoic acids by reacting such acids or equivalent derivatives, e. g. the alkali-metal salts thereof, with ammonia or a primary alkyl-ammonia, whereby para-chloro-benzoic acid may be recovered substantially unchanged, and ortho-chloro-benzoic acid converted to ortho-amino-benzoic acid or an N-mono-alkyl derivative thereof, and recovered as such.

Toluene may be halogenated to form a mixture containing ortho- and para-halo-benzotrihalides, and the latter then hydrolyzed to a mixture of ortho- and para-halo-benzoic acids. For instance, the ortho- and para-chloro-benzotrichlorides obtained by chlorinating toluene both in the side-chain and the nucleus, may be hydrolyzed to the corresponding chloro-benzoic acids. It is known that the latter acids are separable by treatment thereof with various solvents of the nature of water, benzene, or heptane, and also that the calcium salts of such acids can be separated by treatment with water. However, such methods of separation are unsatisfactory for technical purposes. It is further known that halogen in an aromatic nucleus when ortho- to a negative group, such as nitro or carboxyl, possesses greater nobility than when in the para-position to such group.

I have now discovered that the above mentioned halo-acids may substantially be separated by operating according to the herein described method which involves the just-mentioned higher reactivity of ortho-ring-halogen as compared to para-ring-halogen. Accordingly, by employing my new separation method, it is possible to utilize a mixture of ortho- and para-chloro-benzoic acids, such as obtained for instance in the hydrolysis of the corresponding mixed chloro-benzotrichlorides, for the preparation of ortho-amino-benzoic acid (anthranilic acid) or its N-mono-alkyl derivatives, in substantially pure form and in good yields. The para-chloro-benzoic acid remains practically unattacked, and may be recovered in substantially pure state. Hence, such procedure avoids a troublesome separation of the two chloro-benzoic acids preliminarily to a desired reaction involving one of such acids, particularly the ortho-acid. My invention, then, concerns a method of separating ortho- and para-halo-benzoic acids, or it may be considered as a way of conducting a reaction with the ortho-acid in the presence of the para-acid without involving a preliminary separation of a mixture of such acids into its components; the reaction steps become the separation steps.

To the accomplishment of the foregoing and related ends, my invention, then, consists of the method hereinafter fully described and particularly pointed out in the claims, the following description setting forth in detail several modes of carrying out the invention, such disclosed modes illustrating, however, but several ways in which the principle of the invention may be used.

My invention relates specifically to reacting a mixture of ortho- and para-chloro-benzoic acids, with ammonia or a primary aliphatic amine, whereby ortho-amino-benzoic acid (anthranilic acid) or one of the N-mono-alkyl derivatives, is formed and para-chloro-benzoic acid is recovered substantially unchanged, as represented in the following equations:—

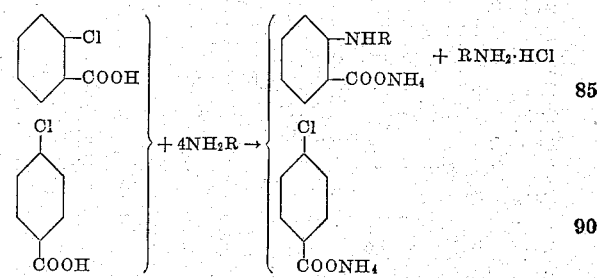

wherein R represents hydrogen or an alkyl group.

In general, a mixture of the herein mentioned halo-acids, aqueous ammonia preferably in sufficient excess of the theoretical amount to neutralize acids present or formed in the reaction mixture, and a copper-containing catalyst, e. g. metallic copper or cuprous oxide, is heated under pressure to the temperature required for reaction. The mixture is cooled after the reaction is substantially completed, and treated in any suitable way to recover the amino-acid product therefrom. For instance, the contents of the reactor may be freed from volatile base by boiling therewith a caustic alkali, and then filtering to remove solids, e. g. cuprous oxide. The filtrate may next be acidified with a mineral acid and refiltered to remove unreacted para-chloro-benzoic acid. Caustic, sufficient in amount to neutralize mineral acid present, may then be added to the filtrate containing the amphoteric amino acid in solution, whereupon the free acid product separates therefrom. Or, the free acid may be precipitated from said filtrate by addition of a sufficient amount of sodium acetate. Or, the latter filtrate containing the amphoteric amino acid, may be rendered faintly alkaline with a caustic alkali and the ortho-amino-benzoic acid or N-mono-alkyl derivative thereof, may be precipitated from solution as a substantially insoluble zinc salt, by addition thereto of a water-soluble zinc salt, e. g. zinc chloride, or sulfate.

The amino-acid may then be obtained from the precipitated zinc salt thereof in any suitable manner, for example, by boiling the latter with an excess of aqueous caustic alkali, separating the zinc oxide formed thereby, acidifying the filtrate with an acid such as acetic acid, and separating the so-formed amino-acid.

The following examples illustrate various ways of utilizing the principle of my invention.

Example 1

A mixture containing 9.3 grams ortho-chloro-benzoic acid and 4.6 grams para-chloro-benzoic acid was reacted in a glass bomb with 0.3 gram cuprous chloride and 3.1 grams of a 33 per cent. aqueous solution of mono-methyl amine at a temperature of about 118° C. for 3 hours. After cooling the reaction mixture and dilution thereof with water, 7.2 grams of sodium hydroxide was added thereto, the solution then being boiled until free from methyl amine. The copper-containing precipitate was filtered off from the solution and the filtrate therefrom was acidified with a mineral acid (hydrochloric acid), thereby precipitating unreacted para-chloro-benzoic acid and recovering 91 per cent. of the latter. The filtrate from the latter acid was made just alkaline to litmus indicator and the zinc salt of N-methyl anthranilic acid was precipitated by the addition of aqueous zinc sulfate solution. The precipitated zinc salt, when washed with water and dried, weighed 8.1 grams. On evaporation of the filtrate to a small volume, followed by cooling, an additional 2 grams of product was obtained. The total yield of zinc salt amounted to 92 per cent. of the theory.

Example 2

In a manner similar to that described in the above example, a mixture containing 19 grams of ortho-chloro-benzoic acid and 9.5 grams of the corresponding para-acid, was reacted with 53 cc. aqueous ammonia (28 per cent.) in the presence of 2.5 grams cuprous chloride, for 5½ hours at 100° C. The recovery of unreacted para-chloro-benzoic acid was 92 per cent. The conversion of the ortho-chloro-benzoic acid was substantially complete, an 88 per cent. yield of the ortho-amino-benzoic acid (anthranilic acid) being obtained (as the zinc salt thereof).

I prefer the approximate reaction temperatures as cited, i. e. about 100° C. and 118° C., respectively, for the preparation of anthranilic acid and its N-mono-methyl derivative. However, I have found that the reactions proceed satisfactorily within certain temperature limits as for instance between 75 to 125° C. in the first case, and 100 to 150° C. in the second case. At lower temperatures the reactions proceed with less speed and at higher temperatures the amines react somewhat with the para-chloro-benzoic acid. Further, when ammonia is employed at higher temperatures, some diphenylamine-ortho-carboxylic acid may be formed.

The catalysts aforementioned, namely cuprous oxide and cuprous chloride, illustrate the fact that copper-containing catalysts, preferably in the cuprous state of oxidation or lower, e. g. the subcuprous state, or even certain forms of activated copper may be employed to promote the ammonolysis reactions involved in the present method. Furthermore, the copper-containing sludge recovered from the reaction mixture may be returned to the process to serve as a reaction catalyst.

I do not limit my invention to the specific reactants noted in the examples. Other related equivalent compounds may be reacted in a similar manner, e. g. the corresponding bromo-benzoic acids and primary alkyl amines, e. g. mono-ethyl-amine, varying the operative details, if and when necessary, depending on the reactants employed.

In short, my present invention involves reacting a mixture of ortho- and para-halo-benzoic acids, or alkali-metal salts thereof, with ammonia or a primary aliphatic amine, by heating the mixture under pressure with a copper-containing catalyst, whereby the ortho-halo-benzoic acid is converted into an amino acid, and the para-halo-benzoic acid is recovered substantially unchanged.

The products obtained herein, i. e. anthranilic acid and N-mono-alkyl derivatives, thereof, are useful in the dye, pharmaceutical and related fields.

Other modes of applying the principle of my invention may be employed instead of those explained, change being made as regards the method herein disclosed, provided the details stated by any of the following claims or the equivalent of such be employed.

I therefore particularly point out and distinctly claim as my invention:—

1. In a method of separating ortho- and para-chloro-benzoic acids, the step which consists in treating a mixture of such acids, with an ammonia base of the formula, $NH_2R$, wherein R may represent hydrogen or an alkyl group, in the presence of a copper-containing catalyst, and at a temperature between 75° and 150° C., whereby only the ortho-chloro-benzoic acid substantially reacts with the base, the para-chloro-benzoic acid remaining practically unreacted.

2. In a method of separating ortho- and para-chloro-benzoic acids, the step which consists in treating a mixture of such acids, with aqueous ammonia, in the presence of a cuprous compound, and at a temperature between 75° and 125° C., whereby only the ortho-chloro-benzoic acid substantially reacts with the base, the para-chloro-benzoic acid remaining practically unreacted.

3. The method of making an ortho-amino-benzoic acid from a mixture of ortho- and para-halo-benzoic acids, which comprises heating the mixture with an aqueous ammonia base of the formula, $NH_2R$, wherein R may represent hydrogen or an alkyl group, under superatmospheric pressure, and at a temperature between 75° and 150° C., whereby an ortho-amino-benzoic acid is formed and the para-halo-benzoic acid remains substantially unchanged, and separating such acids from each other.

4. The method of making an ortho-amino-benzoic acid from a mixture of ortho- and para-chloro-benzoic acids, which comprises heating the mixture with an aqueous ammonia base of the formula, $NH_2R$, wherein R may represent hydrogen or an alkyl group, under superatmospheric pressure in the presence of a copper-containing catalyst, and at a temperature between 75° and 150° C., whereby an ortho-amino-benzoic acid is formed and the para-chloro-benzoic acid remains substantially unchanged, and separating such acids from each other.

5. The method of making an ortho-amino-benzoic acid from a mixture of ortho- and para-chloro-benzoic acids, which comprises heating the mixture with an aqueous ammonia base of the formula, $NH_2R$, wherein R may represent hydrogen or an alkyl group, under superatmospheric pressure in the presence of a cuprous compound, and at a temperature between 75° and 150° C., whereby an ortho-amino-benzoic acid is formed and the para-chloro-benzoic acid remains substantially unchanged, and separating such acids from each other.

6. The method of making ortho-amino-benzoic acid from a mixture of ortho- and para-chloro-benzoic acids, which comprises heating the mixture with aqueous ammonia, under superatmospheric pressure in the presence of a cuprous compound, and at a temperature between 75° and 125° C., whereby ortho-amino-benzoic acid is formed, and the para-chloro-benzoic acid remains substantially unchanged, and separating such acids from each other.

7. The method of making an ortho-amino-benzoic acid, from a mixture of ortho- and para-chloro-benzoic acids, which comprises treating the mixture with an aqueous ammonia base of the formula, $NH_2R$, wherein R may represent hydrogen or an alkyl group, under superatmospheric pressure, and at a temperature between 75° and 150° C., removing unreacted ammonia base from the reaction mixture by heating the latter after being rendered alkaline, separating the copper-containing sludge from the liquid, acidifying the latter with a mineral acid, separating the thereby formed unreacted para-chloro-benzoic acid from the liquid, and recovering the amino acid from the latter.

8. The method of making an ortho-amino-benzoic acid, from a mixture of ortho- and para-chloro-benzoic acids, which comprises treating the mixture with an aqueous ammonia base of the formula, $NH_2R$, wherein R may represent hydrogen or an alkyl group, under superatmospheric pressure in the presence of a copper-containing catalyst, and at a temperature between 75° and 150° C., removing unreacted ammonia base from the reaction mixture by heating the latter after being rendered alkaline, separating the copper-containing sludge from the liquid, acidifying the latter with a mineral acid, separating the thereby formed unreacted para-chloro-benzoic acid from the liquid, precipitating the amino-acid from the filtrate as a zinc salt after said filtrate has been made substantially neutral, and recovering the product from the zinc salt.

9. The method of making ortho-amino-benzoic acid, from a mixture of ortho- and para-chloro-benzoic acids, which comprises treating the mixture with aqueous ammonia, under superatmospheric pressure in the presence of a cuprous compound, and at a temperature between 75° and 125° C., removing unreacted ammonia from the reaction mixture by heating the latter after being rendered alkaline, separating the copper-containing sludge from the liquid, acidifying the latter with a mineral acid, separating the thereby formed unreacted para-chloro-benzoic acid from the liquid, and recovering the ortho-amino-benzoic acid from the latter.

10. The method of making ortho-aminobenzoic acid, from a mixture of ortho- and para-chloro-benzoic acids, which comprises treating the mixture with aqueous ammonia, under superatmospheric pressure in the presence of a cuprous compound, and at a temperature between 75° and 125° C., removing unreacted ammonia from the reaction mixture by heating the latter after being rendered alkaline, separating the copper-containing sludge from the liquid, acidifying the latter with a mineral acid, separating the thereby formed unreacted para-chloro-benzoic acid from the liquid, precipitating the amino-acid from the filtrate as a zinc salt after said filtrate has been made substantially neutral, and recovering the product from the zinc salt.

11. The method of purifying a para-halo-benzoic acid containing the corresponding ortho compound as an impurity, which comprises treating the crude para-halo-benzoic acid with an ammonia base of the formula, $NH_2R$, wherein R may represent hydrogen or an alkyl group, in the presence of a copper-containing catalyst and at a temperature between 75° and 150° C., whereby the ortho-halo-benzoic acid is reacted with the ammonia base, and separating para-halo-benzoic acid from the reaction mixture.

12. The method of purifying a para-halo-benzoic acid containing the corresponding ortho compound as an impurity, which comprises treating the crude para-halo-benzoic acid with aqueous ammonia, in the presence of a cuprous compound and at a temperature between 100° and 150° C., whereby the ortho-halo-benzoic acid is reacted with the ammonia, and separating para-halo-benzoic acid from the reaction mixture.

Signed by me this 12 day of December, 1929.

LINDLEY E. MILLS.